United States Patent
Liang et al.

(10) Patent No.: US 9,462,117 B2
(45) Date of Patent: Oct. 4, 2016

(54) OAM SYSTEM FOR LTE-U AND WI-FI OPERATION AND COEXISTENCE DEPLOYMENT

(71) Applicant: Apple Inc., Cupertino, CA (US)

(72) Inventors: Huarui Liang, Beijing (CN); Tarik Tabet, Los Gatos, CA (US); Farouk Belghoul, Campbell, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/678,187

(22) Filed: Apr. 3, 2015

(65) Prior Publication Data

US 2015/0288809 A1    Oct. 8, 2015

Related U.S. Application Data

(60) Provisional application No. 61/975,096, filed on Apr. 4, 2014.

(51) Int. Cl.
*H04W 4/00* (2009.01)
*H04M 3/22* (2006.01)
(Continued)

(52) U.S. Cl.
CPC ........... *H04M 3/2263* (2013.01); *H04W 16/14* (2013.01); *H04W 24/02* (2013.01); *H04W 72/0426* (2013.01); *H04W 72/0453* (2013.01); *H04W 88/08* (2013.01)

(58) Field of Classification Search
CPC ... H04W 16/14; H04W 16/16; H04W 16/18; H04W 24/02; H04W 24/04; H04W 24/10; H04W 84/12; H04W 84/14; H04W 84/16
USPC ......... 455/414.1, 418, 419, 420, 432, 435.2, 455/435.3, 436, 444, 446, 447, 448, 449, 455/452.2, 552.1
See application file for complete search history.

(56) References Cited

U.S. PATENT DOCUMENTS 7,646,752 B1 *  1/2010  Periyalwar ............ H04L 41/044
                                                    370/216
8,923,225 B2 *  12/2014  Sydor ................. H04W 72/082
                                                    370/329
(Continued)

FOREIGN PATENT DOCUMENTS

GB         2498749 A      7/2013
WO     2014089069 A1      6/2014

OTHER PUBLICATIONS (Author Undisclosed) "U-LTE: Unlicensed Spectrum Utilization of LTE" Huawei Technology Co., Ltd., 2014, pp. 1-20 (20 pages).

*Primary Examiner* — Jean Gelin
(74) *Attorney, Agent, or Firm* — Meyertons Hood Kivlin Kowert & Goetzel, P.C.; Jeffrey C. Hood

(57) ABSTRACT

This disclosure relates to operation and management of cellular communication systems including cells and access points operating in unlicensed frequency bands. According to some embodiments, a base station in a network may receive operation and management policy information, including information for configuring network elements operating in unlicensed frequency bands. The policy information may include information for coordinating network elements operating in unlicensed frequency bands in a manner configured to reduce interference in the unlicensed frequency bands. The base station may provide configuration information to one or more network elements in the network operating in unlicensed frequency bands. The configured network elements may operate in the unlicensed frequency bands in accordance with the configuration information.

17 Claims, 16 Drawing Sheets

(51) Int. Cl.
*H04W 16/14* (2009.01)
*H04W 24/02* (2009.01)
*H04W 88/08* (2009.01)
*H04W 72/04* (2009.01)

(56) References Cited

U.S. PATENT DOCUMENTS

| | | | |
|---|---|---|---|
| 2013/0250882 A1 | 9/2013 | Dinan | |
| 2014/0086212 A1* | 3/2014 | Kafle | H04W 28/044 370/331 |
| 2014/0126410 A1 | 5/2014 | Agarwal | |
| 2014/0160937 A1* | 6/2014 | Richards | H04W 12/06 370/236 |
| 2014/0199994 A1* | 7/2014 | Richards | H04W 36/0088 455/426.1 |
| 2014/0241183 A1* | 8/2014 | Comeau | H04L 5/0098 370/252 |
| 2015/0036672 A1* | 2/2015 | Kim | H04W 48/08 370/338 |

* cited by examiner

OAM SYSTEM FOR LTE-U AND WI-FI OPERATION AND COEXISTENCE DEPLOYMENT

PRIORITY CLAIM

The present application claims benefit of priority to U.S. Provisional Application No. 61/975,096 titled "OAM System for LTE-U and Wi-Fi Operation and Coexistence Deployment" and filed on Apr. 4, 2014, which is hereby incorporated by reference in its entirety as though fully and completely set forth herein.

FIELD

The present application relates to wireless communications, including managing cellular network elements that operate in unlicensed frequency bands.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

In some wireless communication systems, such as certain cellular communication networks, wireless communication is performed on frequency bands that have been licensed (e.g., by a cellular network provider). Additionally, in some wireless communication systems, such as Wi-Fi and Bluetooth wireless communication systems, wireless communication is performed on unlicensed frequency bands, such as the 2.4 GHz ISM frequency band.

SUMMARY

Embodiments are presented herein of apparatuses, systems, and methods for managing cellular network elements that operate in unlicensed frequency bands.

The techniques provided herein may, according to some embodiments, reduce the occurrence and/or severity of interference between network elements operating in unlicensed frequency bands, potentially including between network elements operating as part of different networks and/or between network elements operating according to different wireless communication technologies.

According to some embodiments, certain network elements in a network may receive operation and management policy information, which may include information for configuring other network elements in the network, including those operating in unlicensed frequency bands. The operation and management policy information may, for example, specify how to configure network elements operating in unlicensed frequency bands depending on certain current characteristics of wireless communication systems in the vicinity. Those network elements enforcing the operation and management policy may accordingly measure the relevant parameters and characteristics and configure any network elements for which they are responsible in accordance with the operation and management policy based on the current system parameters.

For example, a base station, which receives operation and management policy information and is tasked with applying the operation and management policy, might acquire (e.g., from user devices served by the base station and/or from other network elements) information regarding nearby network elements, including any or all of identification information, operation frequency information, interference information, type(s) of wireless communication used, network affiliation, and/or any other information. The base station might then determine how to configure any network elements managed by the base station that are configured to operate in unlicensed frequency bands in accordance with the operation and management policy, in view of its knowledge of nearby network elements and their characteristics.

The base station may then, according to some embodiments, provide configuration information to such network elements. The configuration information may include information indicating when to operate and/or at which frequency or frequencies to operate, among various possible information. The times and/or frequencies may be selected, in accordance with the operation and management policy, in a coordinated manner with any other known nearby network elements, such that interference between network elements in unlicensed frequency bands is minimized.

The techniques described herein may be implemented in and/or used with a number of different types of devices, including but not limited to cellular base stations, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
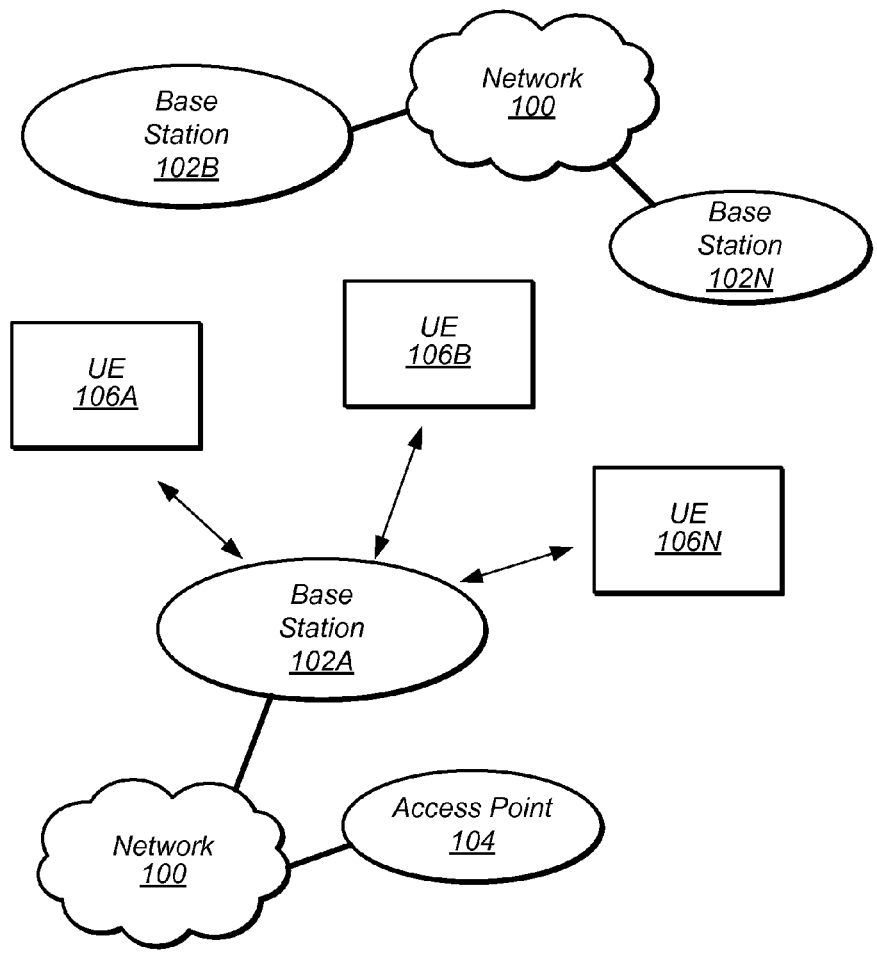
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
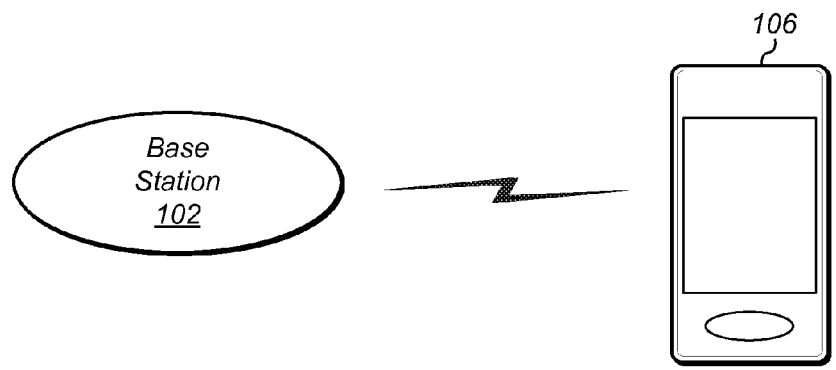
FIG. 2 illustrates an exemplary (and simplified) base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc.

Additionally, one or more access points (such as access point 104) may be communicatively coupled to the network 100. These may include Wi-Fi access points configured to support cellular network offloading and/or otherwise provide wireless communication services as part of the wireless communication system illustrated in FIG. 1.

Base station 102A and other similar base stations (such as base stations 102B . . . 102N) and/or access points (such as access point 104) operating according to the same or a different wireless communication standard may thus be provided as a network of cells, which may provide continuous or nearly continuous overlapping service to UEs 106A-N and similar devices over a wide geographic area via one or more wireless communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations) and/or wireless local area networks (WLANs), which may be referred to as "neighboring cells" or "neighboring WLANs" (e.g., as appropriate), and/or more generally as "neighbors". Such neighbors may also be capable of facilitating communication between user devices and/or between user devices and the network 100. Such neighbors may include "macro" cells, "micro" cells, "pico" cells, "femto" cells, WLANs, and/or cells which provide any of various other granularities of service area size. For example, base stations 102A-B illustrated in FIG. 1 might provide macro cells, base station 102N might provide a micro cell, and access point 104 might be a Wi-Fi AP which provides a WLAN. Note also that in some instances, a UE (such as one of UEs 106A-N) may be served by multiple neighboring cells (e.g., a serving set), for example using coordinated multipoint (CoMP) wireless communication. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

Figure 5:
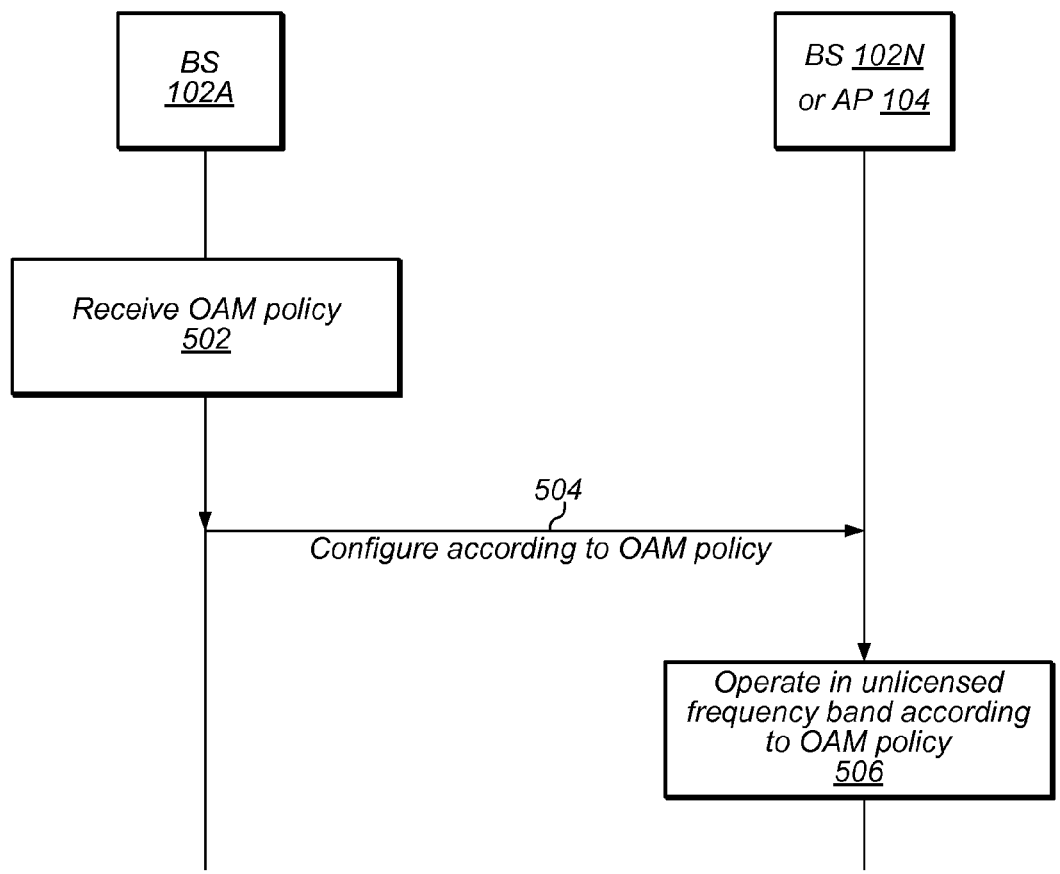
FIG. 5 is a communication flow diagram illustrating an exemplary method for managing network elements operating in unlicensed frequency bands, according to some embodiments.

Any or all of the network 100, base stations 102, access points 104, and/or UEs 106 illustrated in FIG. 1 may be configured to implement or support implementation of part or all of the methods described herein, including, inter alia, the method of FIG. 5.

FIG. 2 illustrates an exemplary (and simplified) system in which user equipment 106 (e.g., one of the devices 106A through 106N) is in communication with a base station 102 (e.g., one of the base stations 102A through 102N), according to some embodiments. The UE 106 may be a device with cellular communication capability, such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple radio access technologies/wireless communication protocols. For example, the UE 106 may be configured to communicate using two or more of GSM, UMTS, CDMA2000, LTE, LTE-A, WLAN/Wi-Fi, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios that are shared between multiple wireless communication protocols and one or more radios that are used exclusively by a single wireless communication protocol. For example, the UE 106 might include a shared radio for communicating using either of LTE and 1×RTT (or LTE or GSM), and separate radios for communicating using each of Wi-Fi and Bluetooth. Other configurations are also possible.

Figure 3:
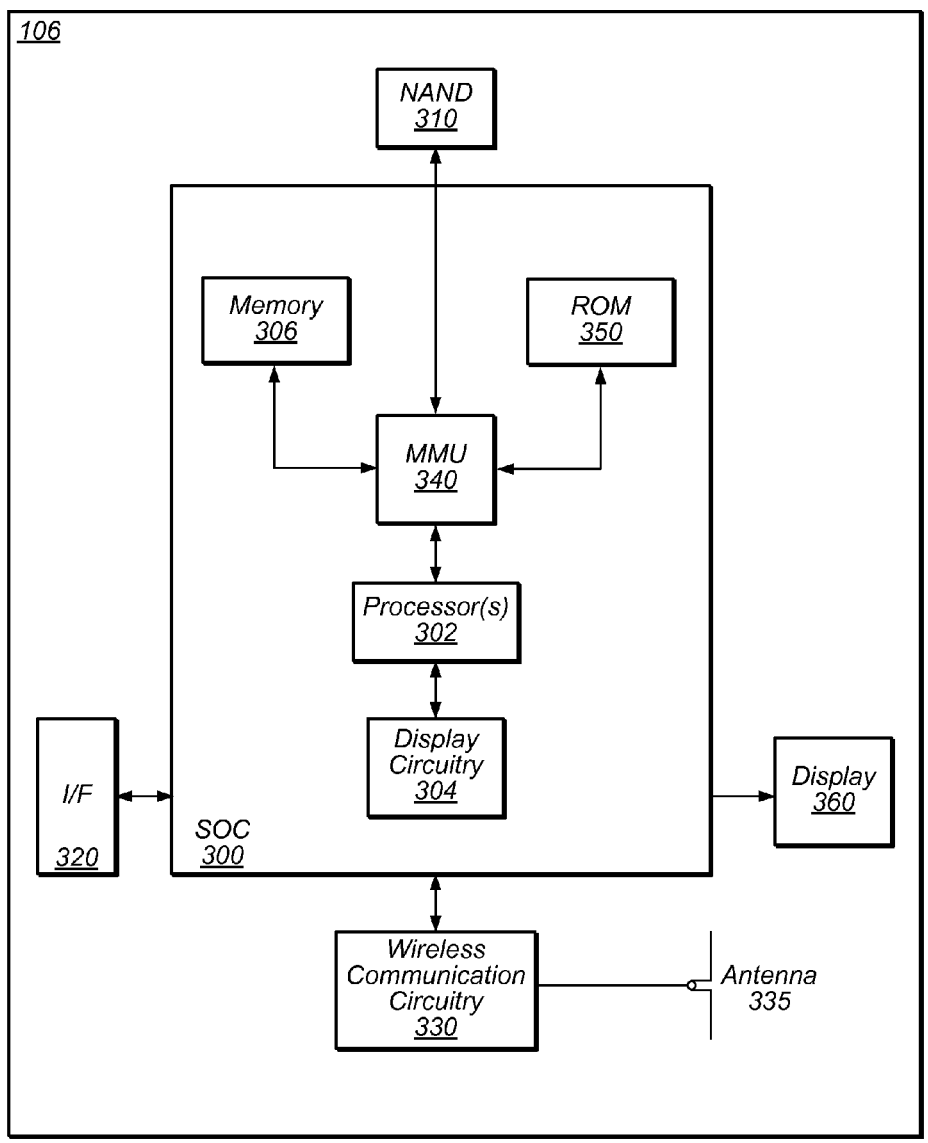
FIG. 3 illustrates an exemplary block diagram of a UE, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302, which may execute program instructions for the UE 106, and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna, and in some embodiments multiple antennas, for performing wireless communication with base stations and/or other devices. For example, the UE device 106 may use antenna(s) 335 to perform the wireless communication. As noted above, the UE 106 may be configured to communicate wirelessly using multiple wireless communication standards in some embodiments.

As described further subsequently herein, the UE 106 may include hardware and software components for implementing part or all of the methods described herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Alternatively (or in addition) the processor(s) 302 of the UE device 106, in conjunction with one or more of the other components 300, 304, 306, 310, 320, 330, 335, 340, 350, 360 may be configured to implement part or all of the features described herein.

Figure 4:
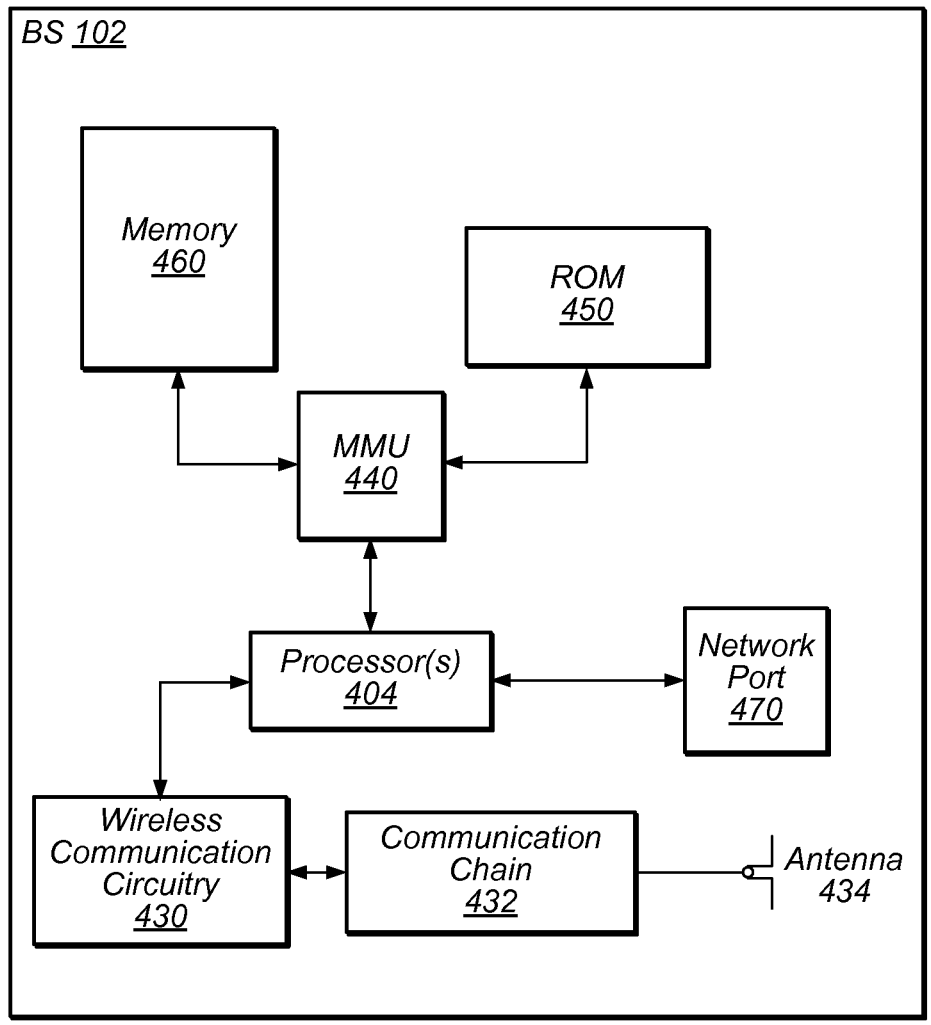
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404, which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in relation to FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via wireless communication circuitry 430. The antenna(s) 434 communicates with the wireless communication circuitry 430 via communication chain 432. Communication chain 432 may be a receive chain, a transmit chain or both. In some implementations, communication chain 432 may include multiple receive chains, multiple transmit chains, or both. The wireless communication circuitry 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as either or both of an LTE base station and a Wi-Fi access point. As another possibility, the base station 102 may include a multi-mode radio, which is capable of performing communications according to any of multiple wireless communication technologies (e.g., LTE and Wi-Fi).

The BS 102 may include hardware and software components for implementing part or all of the methods described herein. The processor(s) 404 of the base station 102 may be configured to implement part or all of the methods described herein, e.g., by executing program instructions stored on a memory medium (e.g., a non-transitory computer-readable memory medium). Alternatively, the processor(s) 404 may be configured as a programmable hardware element, such as an FPGA (Field Programmable Gate Array), or as an ASIC (Application Specific Integrated Circuit), or a combination thereof. Alternatively (or in addition) the processor(s) 404 of the BS 102, in conjunction with one or more of the other components 430, 432, 434, 440, 450, 460, 470 may be configured to implement part or all of the features described herein.

FIG. 5—Communication Flow Diagram

FIG. 5 is a communication/signal flow diagram illustrating an example method for managing cellular network elements that operate in unlicensed frequency bands, according to some embodiments. Aspects of the method of FIG. 5 may be implemented by a cellular base station or Wi-Fi access point, or more generally in conjunction with any of the computer systems or devices shown in the above Figures, among other devices, as desired.

In various embodiments, some of the elements of the method shown may be performed concurrently, in a different order than shown, or may be omitted. Additional elements may also be performed as desired. As shown, the method may operate as follows.

In 502, a "first base station" (e.g., BS 102A) may receive an operation and management (OAM) policy. The OAM policy may be received from an OAM policy manager that manages a first wireless service provider's network. The OAM policy manager may itself be implemented by the first base station or may be implemented as part of a separate network element in the first wireless service provider's network.

The OAM policy may include any of various OAM policy information, such as parameters and/or instructions according to which the first base station may operate, and/or parameters and/or instructions according to which to configure other network elements to operate.

In 504, the first base station may configure a network element in the first wireless service provider's network that operates in an unlicensed frequency band according to the OAM policy. The network element may be any of various network elements, such as a second base station (e.g., BS 102N) or an access point (e.g., AP 104). Configuring the network element may include providing, from the OAM policy, policy and/or parameter information that relates to the network element. For example, configuring the network element may include providing an activation or deactivation indication or schedule, which may indicate times at which to operate and/or times at which not to operate. As another example, configuring the network element may include providing an indication of a frequency or frequency range (e.g., in the unlicensed frequency band) on which to operate.

The OAM policy information may be configured in particular to manage potential interference in the unlicensed frequency band. Because of the unlicensed aspect of an unlicensed frequency band, it may be possible for multiple wireless communication technologies to be used simultaneously in a manner that results in interference and degraded communication characteristics for one or more of the those interfering wireless communication technologies. It may furthermore be possible in such a band for multiple network operators to attempt to use the same wireless communication technology in an uncoordinated manner, which also or alternatively results in interference and degraded communication characteristics for their networks. OAM policy information, such as scheduling of time-sharing and/or selecting operating frequencies in a manner coordinated to avoid or reduce interference between network elements of the same and/or different networks operating according to the same and/or different wireless communication technologies, may thus function to manage/control such potential interference in unlicensed frequency bands.

In 506, the network element (e.g., BS 102N or AP 104) may operate in the unlicensed frequency band according to the OAM policy. This may include not operating (e.g., deactivating or turning itself off) during certain scheduled times and operating (e.g., activating or turning itself on) during certain scheduled times, and/or operating on a specific frequency or frequency range indicated in the OAM policy.

Note additionally that, at least in some instances, OAM policy may be informed by/based on information regarding current operational characteristics of network elements that may be provided by the first base station. For example, the first base station may be capable of automatically maintaining information concerning neighbors of the first base station, and may provide such information to the OAM entity. The information maintained by the first base station may include identification information, operation frequency information, interference information, and/or any of various other neighbor information for neighboring cells and/or neighboring WLANs.

Such information may be maintained by the first base station as part of communications with user devices attached to the first base station. For example, user devices attached to the first base station may at times detect and/or perform measurements on neighboring cells, Wi-Fi networks, and/or any of various other possible network elements, and provide some or all of the information collected as part of such detection and/or measurements to the first base station. As another (additional or alternative) possibility, network elements coupled to the first base station may provide information regarding their own operation, and/or may collect information (from user devices attached to those network elements) regarding their neighboring cells, Wi-Fi networks, and/or any of various other possible network elements. As a still further possibility, information (e.g., regarding operating characteristics of network elements belonging to different networks) may be received by the first base station from one or more network nodes of different networks, e.g., by way of an inter-network communication interface. Such information may be used to determine policy decisions, for example by determining if any network elements are interfering or have the potential to interfere with each other and selecting time sharing policies and/or frequency assignments to mitigate or avoid interference between those network elements.

FIGS. 6-19—Additional Information

FIGS. 6-19 and the information provided herein below in conjunction therewith are provided by way of example of various considerations and details relating to possible systems in which the method of FIG. 5 and/or other aspects of this disclosure may be implemented, and are not intended to be limiting to the disclosure as a whole. Numerous variations and alternatives to the details provided herein below are possible and should be considered within the scope of the disclosure.

Figure 6:
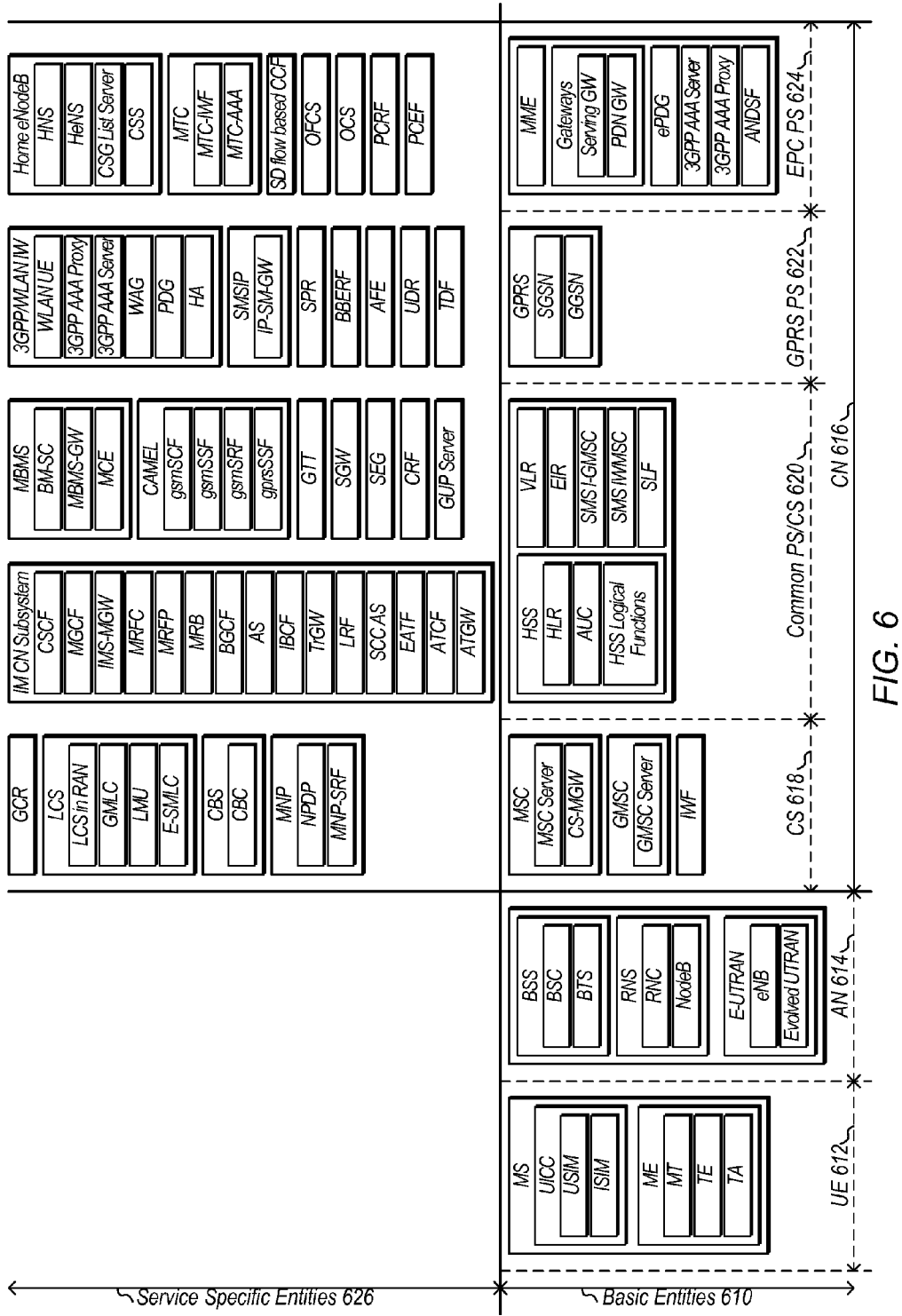
FIGS. 6-7 illustrate exemplary OAM interfaces and entities with which an OAM may interface.

FIG. 6 illustrates an exemplary set of entities with which an OAM entity of a communication network may have interfaces, in an exemplary 3GPP deployment, such as according to 3GPP TS 32.102, according to some embodiments. As shown, the entities may include various basic entities 610, potentially including those in user equipment (UE) 612, access network (AN) 614, and core network (CN) 616 realms, as well as service specific entities 626 (e.g., depending on the specific services provided as part of the communication network). The CN entities 616 may further be distinguished as belonging to circuit switched (CS) 618, common packet switched (PS)/CS 620, general packet radio service (GPRS) PS 622, or evolved packet core (EPC) PS 624 domains. Note that RAN3 may define what RAN parameters (high level principles) transfer to OAM. The OAM may push parameters to the RAN.

Figure 7:
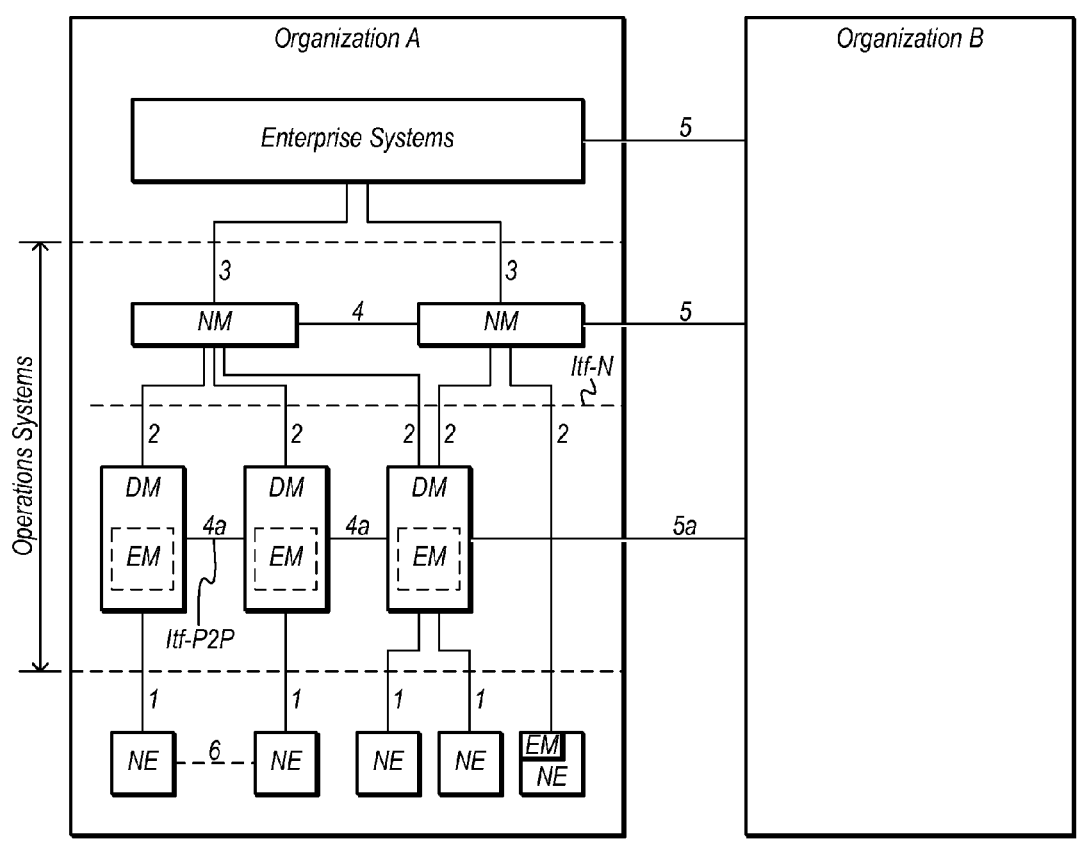

FIG. 7 illustrates exemplary possible OAM interfaces within and between networks, according to some embodiments. The network elements (NEs) illustrated in FIG. 7 may be representative of macro base stations (e.g., macro eNodeBs or MeNBs), small cell base stations (e.g., small eNodeBs or SeNBs), Wi-Fi access points, and/or any of various other possible network elements. As shown, interface 1 may be between NEs and the element manager (EM) of a particular public land mobile network (PLMN) organization or wireless service provider. Interface 2 may be between EMs and the network manager (NM) of the PLMN. Note that in certain cases the EM functionality may reside in the NE, in which case this interface may be directly from NE to NM. These management interfaces may be given the reference name Itf-N. Interface 3 may be between enterprise systems and NMs of a given PLMN organization. Interface 4 may be between NMs of a given PLMN organization, and interface 4a may be between the Domain Managers (DMs) of a given PLMN organization (as shown, in some instances interface 4a may also be referred to as Itf-P2P). Interface 5 may be between enterprise systems of different PLMN organizations and/or between NMs of different PLMN organizations, and interface 5a may be between the DMs of different PLMN Organizations. Interface 6 may be between NEs of a given PLMN organization.

Figure 8:
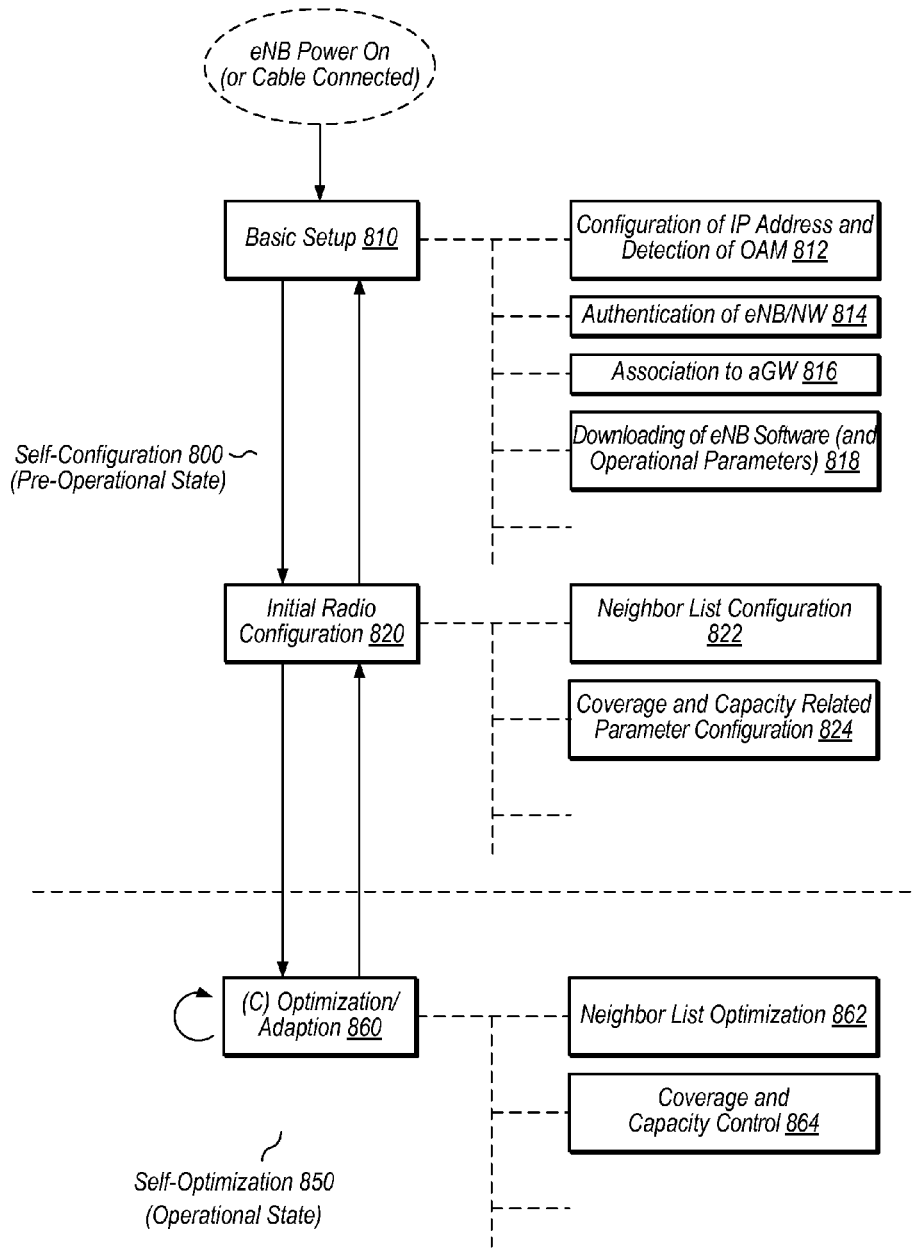
FIGS. 8-10 illustrate exemplary aspects of possible SON functionality in a cellular network, according to some embodiments.

FIG. 8 illustrates exemplary self-organizing network (SON) functionality, which may be implemented by a base station (e.g., eNB) operating in a PLMN, according to some embodiments. As shown, the SON functionality may include various states, such as self-configuration 800 and self-optimization 850. A goal of implementing SON functionality may include reducing the operator configuration load, for example, to reduce configuration work on the eNB for neighbor relations and to reduce OAM interaction with the eNB.

In self-configuration 800, the OAM entity may only be involved in providing remote eNB IP configuration, e.g., for establishing a connection between the eNB and the EPC. For example, as shown, self-configuration may include basic setup 810 of the eNB and initial radio configuration 820 of the eNB. Basic setup 810 may include configuration of IP address and detection of OAM 812, authentication of the eNB and the network 814, association of the eNB with a gateway 816, and downloading of eNB software and operational parameters to the eNB 818. Initial radio configuration 820 may include neighbor list configuration 822 and coverage and capacity related parameter configuration 824. Note that other basic setup and initial radio configuration arrangements are also possible, potentially including any of a variety of other possible alternative or additional steps (as indicated by the continuing dashed lines illustrated in FIG. 8 following steps 818 and 824), e.g., according to various implementations.

In Self-optimization 850, the OAM may be involved in providing on/off policy/indications, e.g., for energy saving. For example, as shown, self optimization 850 may include optimization and adaptation 860, which may further include neighbor list optimization 862 and coverage and capacity control 864. Note that other optimization and adaptation arrangements are also possible, potentially including any of a variety of other possible alternative or additional steps (as indicated by the continuing dashed lines illustrated in FIG. 8 following step 864), e.g., according to various implementations.

Figure 9:
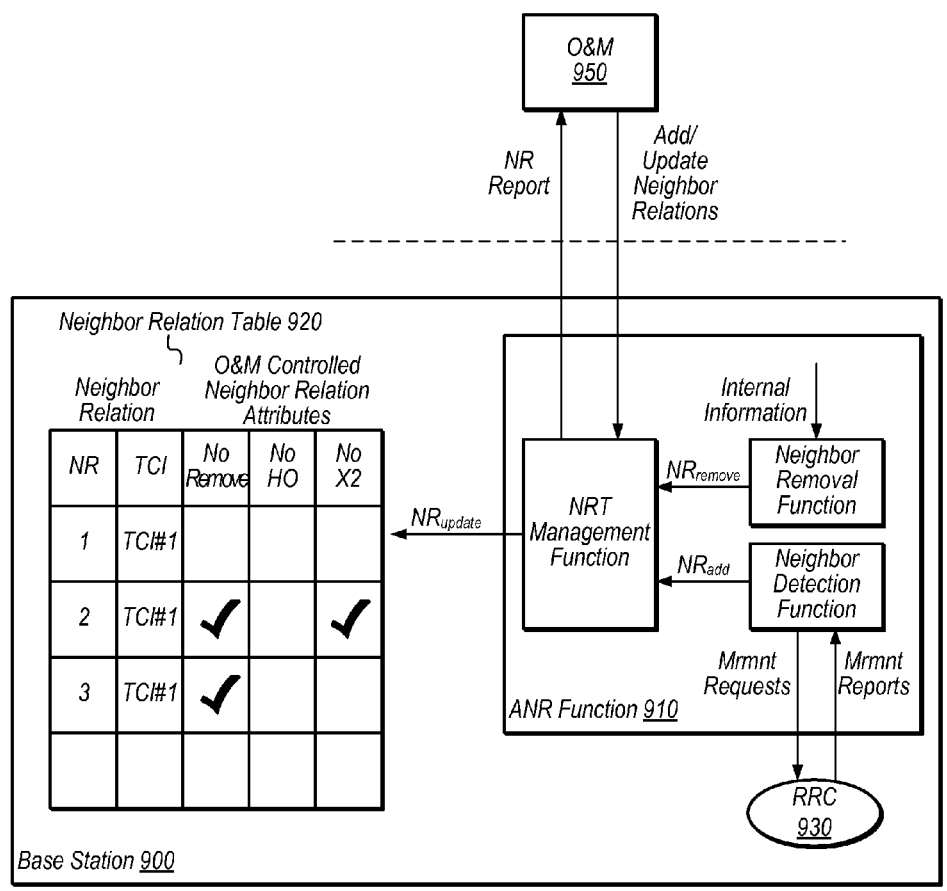

FIG. 9 illustrates exemplary automatic neighbor relations (ANR) functionality (according to some embodiments), which may be one example of a SON behavior which may be implemented by a base station in a PLMN; ANR may reduce the operator configuration work load of maintaining a neighbor relations table (NRT) at each base station, at least in some instances.

As shown, the ANR function 910 may maintain a NRT 920 for the base station 900 at which the ANR function 910 is implemented. The NRT 920 may include various policy information relating to neighbors of the base station, such as whether the neighbor should not be removed from the NRT 920, whether the neighbor should be used for handover reasons, and/or whether the base station should use an X2 interface in order to initiate procedures (such as handovers, among various other possible procedures) with the base station parenting the neighbor.

The ANR 910 may populate and update the NRT 920 based on information received from the base station's radio resource control (RRC) 930 functionality, which may include updates (e.g., measurement reports) received from user devices attached to a cell provided by the base station 900. The ANR function 910 also may, e.g., occasionally, provide neighbor relations reports to the OAM entity 950, and/or receive updates or additions to the NRT 920 from the OAM 950. Additionally, in some instances, the ANR 910 may remove neighbors from the NRT 920 based on internal information (e.g., if not forbidden to do so according to the NRT 920).

Figure 10:
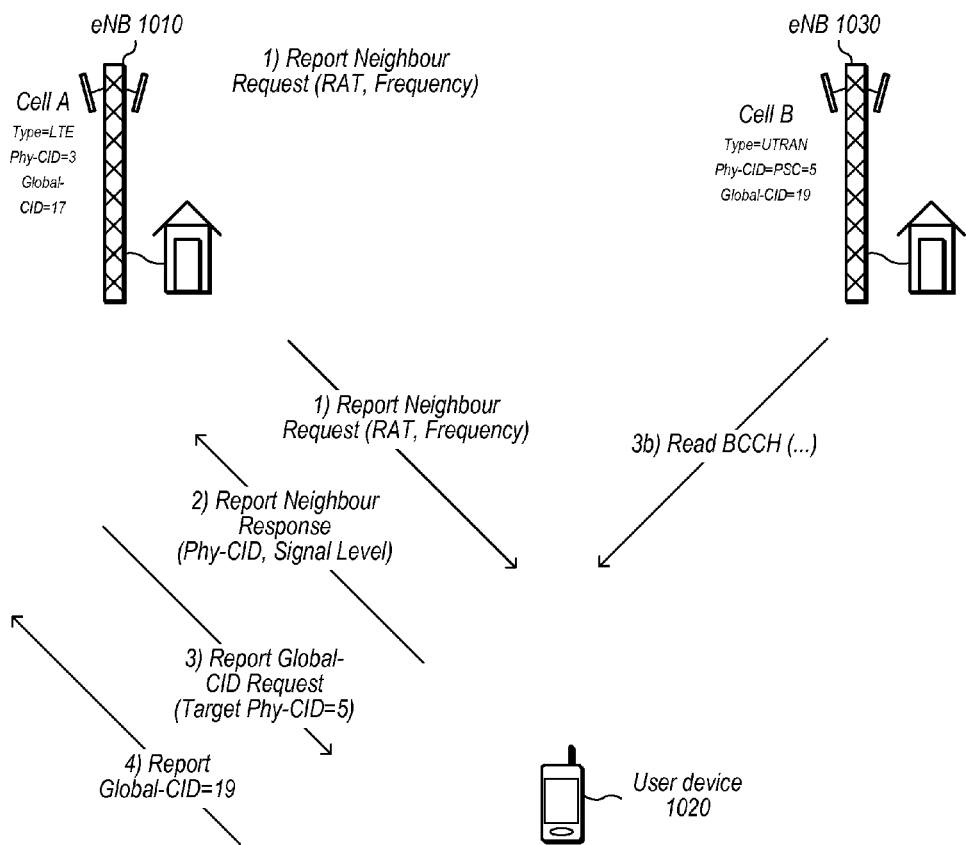

FIG. 10 illustrates an exemplary scenario in which an ANR function of an eNB may obtain neighbor information from a user device. As shown, an eNB 1010 (e.g., providing cell A illustrated in FIG. 10) may request a neighbor report from a user device 1020. The user device 1020 may determine the physical layer cell identifier (Phy-CID) and signal level of a second base station 1030 (e.g., providing cell B illustrated in FIG. 10) and provide this information to the eNB 1010. The eNB 1010 may further request the global cell identifier (global-CID) of the second base station 1030, which may then be obtained and provided back to the eNB 1010 by the user device 1020. Note that some or all of this behavior may be performed as part of normal service provision (e.g., for determining serving cell, handover candidates, etc.) for the user device 1020 illustrated in FIG. 10, e.g., in addition to/in conjunction with its utility in providing information to the ANR to maintain an updated NRT.

As an energy saving feature, it may be the case that a network element may be switched on and off by the network operator, the network OAM entity, and/or autonomously by the network element itself. For example, depending on long-term (e.g., averaged) loading considerations, it might be determined that a particular cell is superfluous, and the base station providing the cell may accordingly be switched off for a length of time. When dormant or switched off, the base station may not send any signaling, and may generally conserve power.

For a base station to internally decide to switch on/off, the base station may send a base station configuration update to neighboring base stations; for example, an eNB in a 3GPP deployment might send an eNB configuration update such as described in TS 36.423 section 9.1.2.9 using the X2 interface with neighboring eNBs in an intra-RAT scenario. A related S1 message may be sent to base stations operating according to other RATs in an inter-RAT scenario.

If OAM is involved in such a decision, the OAM may decide which cell enters or leaves the dormant mode, and intra-RAT and inter-RAT neighbors of the cell may be informed that the selected cell is entering or leaving the dormant mode by the OAM.

While some cellular systems may utilize only licensed frequency bands, in some instances a network operator may deploy cells (e.g., small cells) that operate in unlicensed frequency bands, such as industrial-scientific-medical (ISM) frequency bands. Such cells may be referred to as LTE-U cells. In order for such LTE-U cells to co-exist with Wi-Fi communications in such bands, an on/off mechanism may be provided for LTE-U deployments. The mechanism may help prevent LTE-U cells from blocking Wi-Fi devices from accessing channels, which may be important since LTE transmission timelines may typically be longer than Wi-Fi transmission timelines.

While LTE Releases 11/12 include an energy saving on/off mechanism for small cells, the mechanism is relatively static (e.g., not sufficiently dynamic to adapt to interference or short-term load based triggers) and relatively slow. Accordingly, an on/off mechanism that may be more suitable for small cells operating in unlicensed frequency bands, such as one that considers interference levels, loading conditions, and/or coexistence issues, may be used in such scenarios.

In particular, a centralized OAM entity for network planning and resource sharing may be used between macro eNBs, LTE-U small cells, and Wi-Fi APs managed by operators. LTE-U/Wi-Fi channel frequencies and interference measurements may fall within the scope of OAM parameters. Additionally, OAM policy may encompass an on/off trigger mechanism by macro eNBs for LTE-U cells and Wi-Fi APs. Changing channel frequency deployment of LTE-U cells and Wi-Fi APs based on interference measurement(s) (e.g., frequency hopping mechanism) may fall within the scope of the OAM policy.

An OAM architecture for such wireless communication systems encompassing unlicensed frequency bands may include interfaces between macro eNBs and small cells (and Wi-Fi APs) for implementing the OAM policy. Furthermore, SON report mechanisms may be extended, e.g., in order to improve OAM policy updates with respect to network elements operating in unlicensed frequency bands. In addition, an interface for inter-operator OAM coordination may be provided, e.g., in order to support inter-operator coordination in unlicensed frequency bands.

Figure 11:
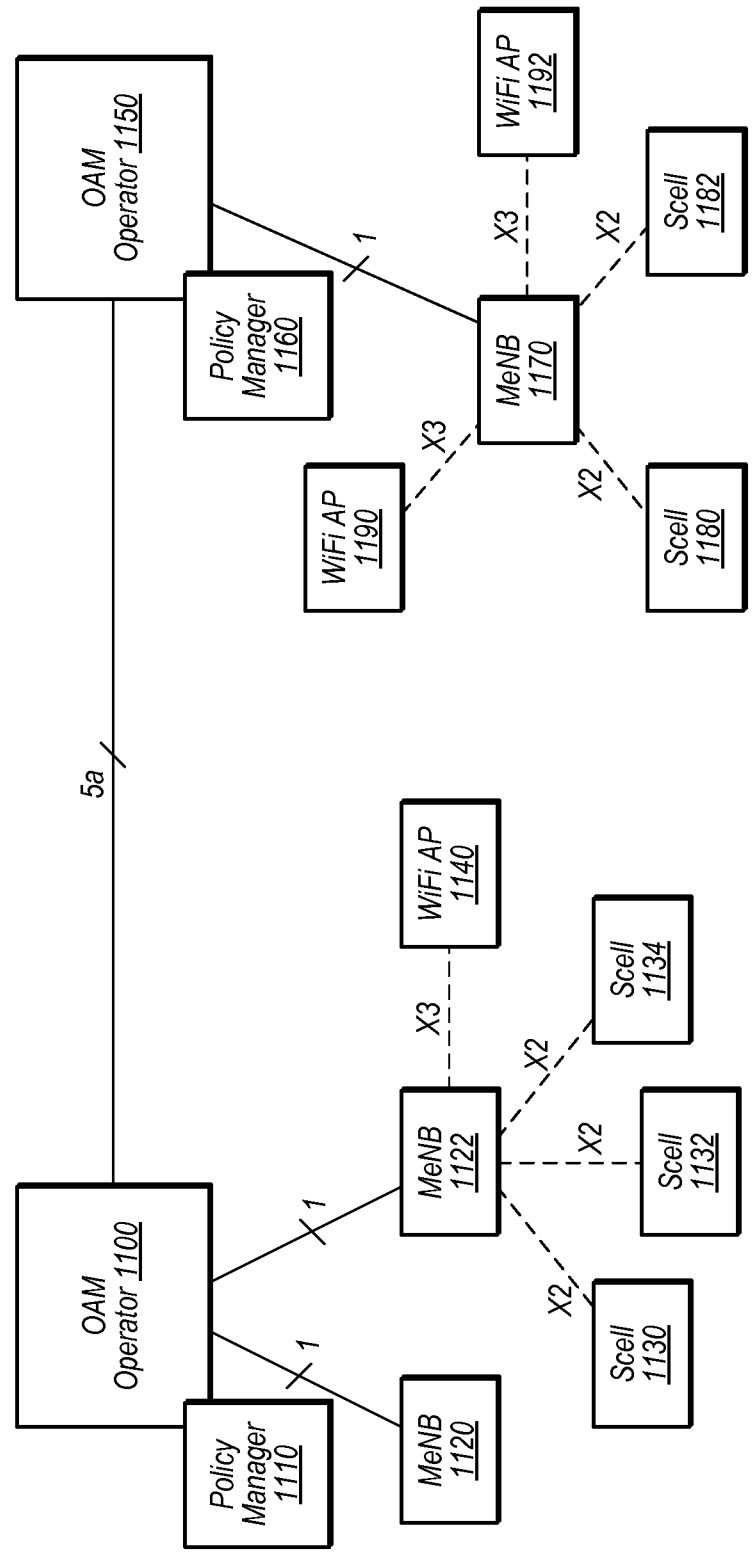
FIG. 11 illustrates an exemplary OAM architecture for managing network elements operating in unlicensed frequency bands, according to some embodiments.

FIG. 11 illustrates an example of such an OAM architecture for managing and supporting network elements operating in unlicensed frequency bands. As shown, each of multiple network operators (e.g., OAM operator 1100 and OAM operator 1150) may have various network elements deployed in a particular region. Each network operator's OAM entity may include an OAM policy manager (e.g., policy managers 1110, 1160), which may be provisioned to macro eNBs (e.g., MeNBs 1120, 1122, 1170) of that network via interface 1. The macro eNBs may in turn interface with small cells (e.g., Scells 1130, 1132, 1134, 1180, 1182), for example using the X2 interface, and Wi-Fi APs (e.g., Wi-Fi APs 1140, 1190, 1192), for example using an X3 interface described further subsequently herein. Additionally, an inter-operator interface 5a may be provided, on which each OAM's on/off policy and information such as the frequency channels of Wi-Fi APs and LTE-U cells may be communicated.

Figure 12:
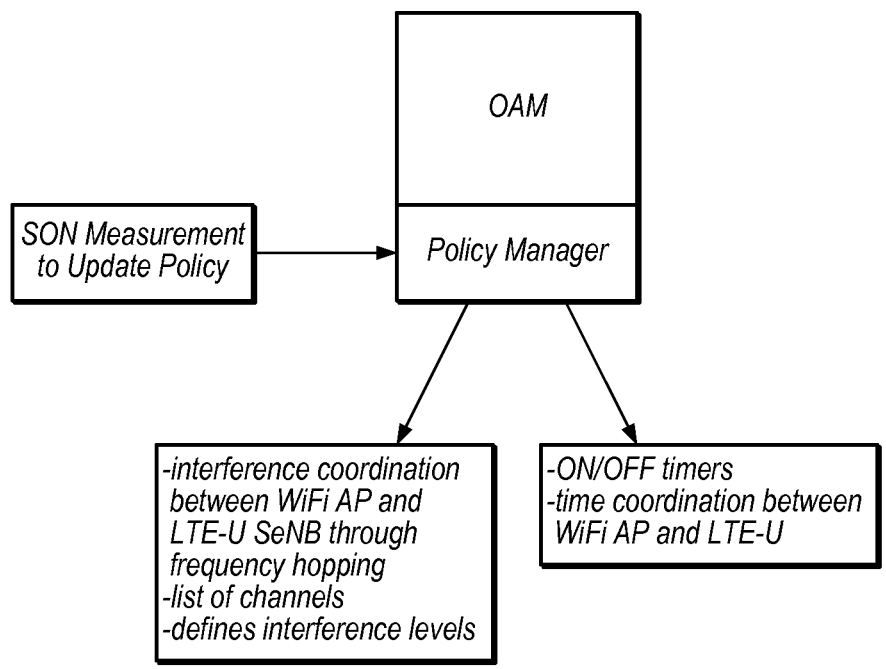
FIG. 12 illustrates an exemplary OAM Policy Manager configured to manage network elements operating in unlicensed frequency bands, according to some embodiments.

Thus, the OAM may provision the various base stations and APs with on/off policy and parameters. The macro eNB(s) may measure all relevant parameters and apply the policy. This may include triggering LTE-U cells and Wi-Fi APs to be on or off, and/or to operate in different frequency channels (frequency hopping). Additionally, UEs may report SON measurements to the macro eNBs and the small cells, which may in turn be transferred to the OAM. The OAM may from time to time receive these and any other measurements and parameters and update the OAM policy as desired. Note that the role of the OAM policy manager with respect to the network elements, according to some embodiments, is also illustrated in FIG. 12.

Figure 13:
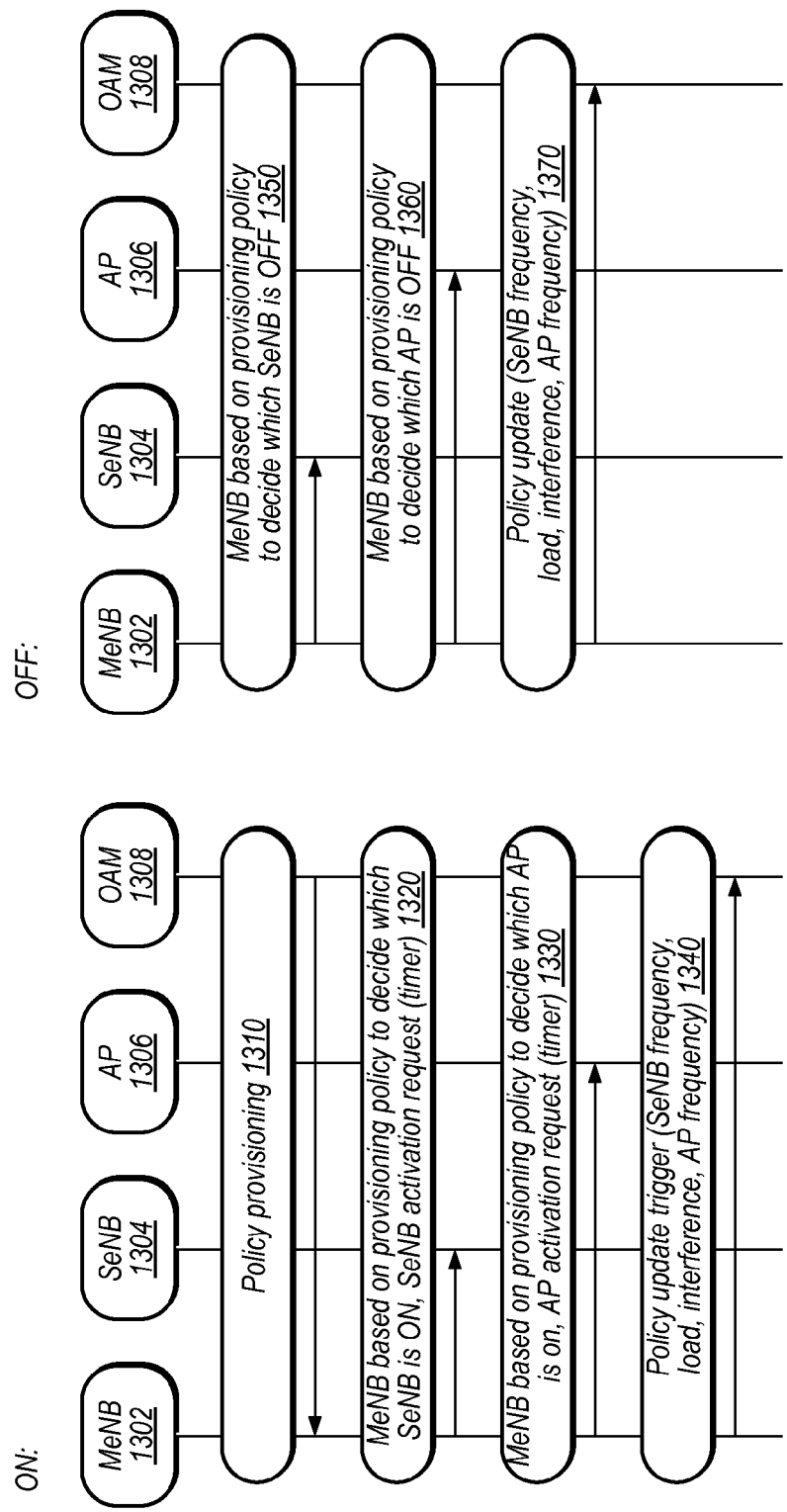
FIGS. 13-14 illustrate exemplary OAM communication flows for on/off and frequency hopping respectively, according to some embodiments.
Figure 14:
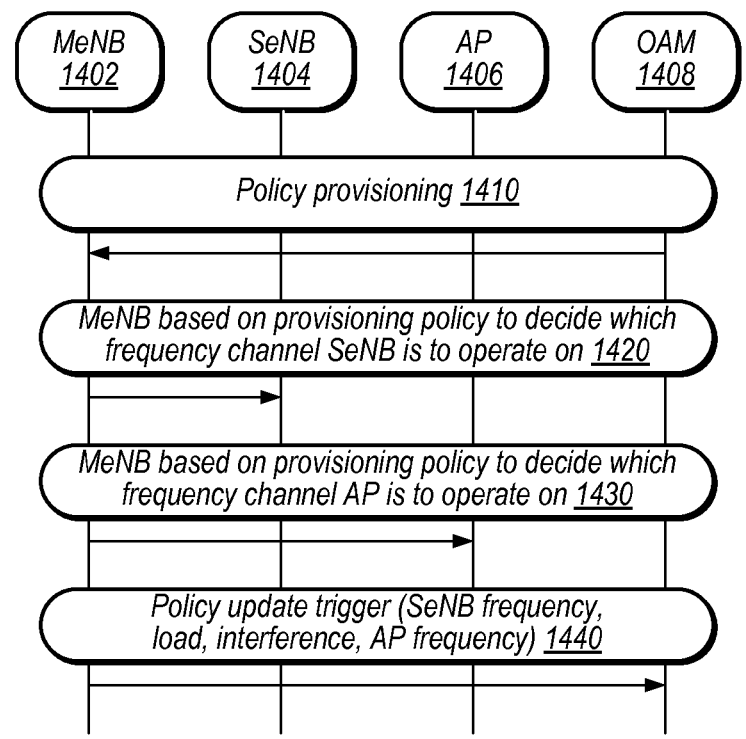

FIGS. 13 and 14 illustrate communication flow between a macro eNB, a small eNB, a Wi-Fi AP, and an OAM entity for implementing on/off policy and operation frequency changes respectively.

As shown in FIG. 13, in 1310 an OAM 1308 may provide initial policy provisioning to a MeNB 1302. Based on the policy, the MeNB 1302 may decide, and provide indications of, which SeNBs and which APs to trigger on and/or off, possibly including timer and/or more detailed scheduling information such as a daily or weekly operation schedule. For example, in 1320, the MeNB 1302 may indicate to SeNB 1304 to activate; in 1330, the MeNB 1302 may indicate to AP 1306 to activate; and in 1340, the MeNB 1302 may provide a policy update trigger back to the OAM 1308. Similarly, in 1350, the MeNB 1302 might indicate to the SeNB 1304 to deactivate; in 1360, the MeNB 1302 might indicate to the AP 1306 to deactivate; and in 1370, the MeNB 1302 might provide a further policy update back to the OAM 1308.

As shown in FIG. 14, in 1410 an OAM 1408 may provide initial policy provisioning to a MeNB 1402. Based on the policy, the MeNB 1402 may decide, and provide indications of, frequency channels on which SeNB 1404 and AP 1406 are to operate. For example, in 1420, the MeNB 1402 may indicate to the SeNB 1404 on which frequency to operate; in 1430, the MeNB 1402 may indicate to the AP 1406 on which frequency to operate; and in 1440, the MeNB 1402 may provide a policy update trigger back to the OAM 1408.

Note that additionally (e.g., on an occasional, possibly periodic basis), a MeNB may obtain information regarding operational frequency, load, and/or interference for some or all SeNBs and APs under the management of the MeNB, and provide such information to the OAM when a policy updated is triggered (e.g., in one or more of steps 1340, 1370, and/or 1440 of FIGS. 13-14).

Figure 15:
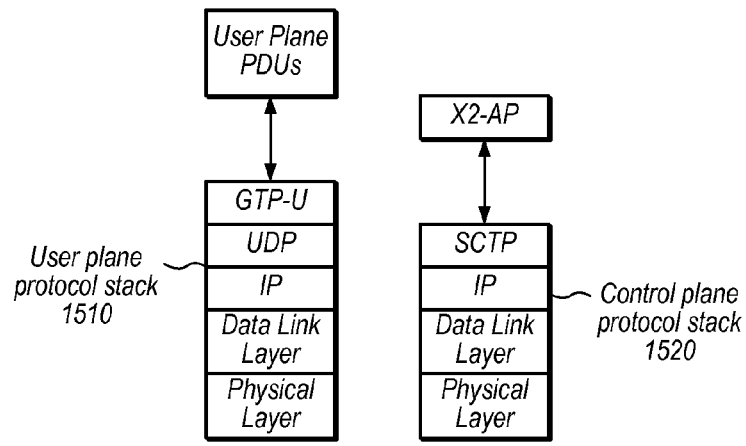
FIGS. 15-17 illustrate exemplary aspects of an X3 interface, according to some embodiments.
Figures 16, 17:
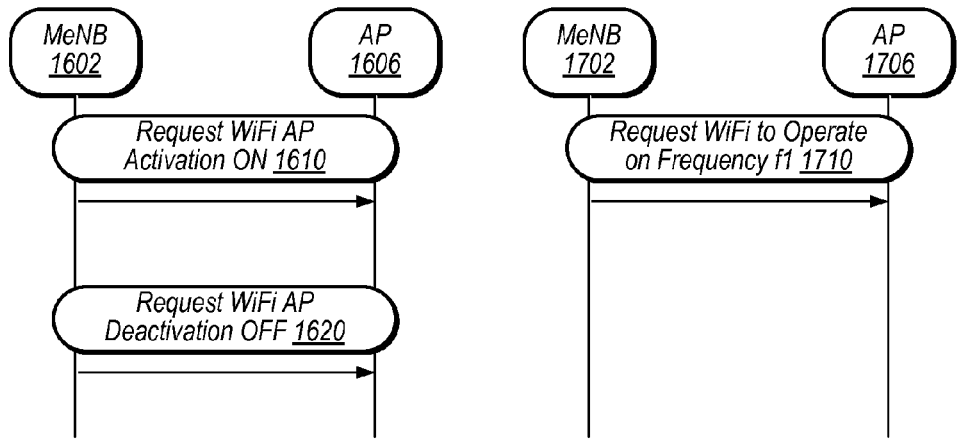

FIGS. 15-17 illustrate aspects of an X3 interface, which may be used between eNBs and Wi-Fi APs. The X3 interface may utilize the same protocol stack as X2, including both user plane protocol stack 1510 and control plane protocol stack 1520, such as illustrated in FIG. 15. However, in contrast with X2, certain additional (new) messages may be defined and used in X3 relative to X2. For example, according to some embodiments, X3 may include messages for requesting activation, deactivation, and/or change of operation frequency.

FIG. 16 is a communication flow diagram more particularly illustrating exemplary X3 messages for requesting activation and/or deactivation of a Wi-Fi AP, according to some embodiments. As shown, in 1610 a MeNB 1602 may provide a message requesting activation ("ON") of a Wi-Fi AP 1606 using the X3 interface. In some instances, the message may include a timer, e.g., for indicating a length of time for which to activate. In 1620, the MeNB 1602 may provide a message requesting deactivation ("OFF") of the Wi-Fi AP 1606 using the X3 interface, which may similarly include a timer for deactivation length, at least in some instances.

FIG. 17 is a communication flow diagram more particularly illustrating an exemplary X3 message for requesting that a Wi-Fi AP operate on a different frequency channel. As shown, in 1710 a MeNB 1702 may provide a message using the X3 interface requesting that a Wi-Fi AP 1706 operate on a different frequency channel. In some embodiments, the request may specify a new channel (e.g., "f1") on which to operate.

As previously noted, the OAM policy provided by the OAM entity of a network operator's network to the network elements (such as MeNBs) of the network may include policy and parameter information for managing network elements operating in unlicensed frequency bands, such as interference level thresholds and/or timing, timers for on/off of specific network elements, possible LTE-U and Wi-Fi channels, etc. As an example, the following represents one possible XML entry format which may be used to communicate such information:

```
<element name="LTEUCoordination">
  <complexType>
    <sequence>
      <element ref="cd:MeasurementQuantity-LTEU" minOccurs="0"/>
      <element name="MeasurementQuantity-AP" minOccurs="0"/>
      <element name="TimerON" type="unsignedInt" minOccurs="0"/>
      <element name="TimerOFF" type="unsignedInt" minOccurs="0"/>
      <element name="FreqChannelAP" type="unsignedInt" minOccurs="0"/>
      <element name="FreqChannelLTEU" type="unsignedInt" minOccurs="0"/>
      <element name="ThresholdInterferenceLTEU" type="integer" minOccurs="0"/>
      <element name="ThresholdInterferenceAP" type="integer" minOccurs="0"/>
    </sequence>
  </complexType>
</element>
```

Figure 18:
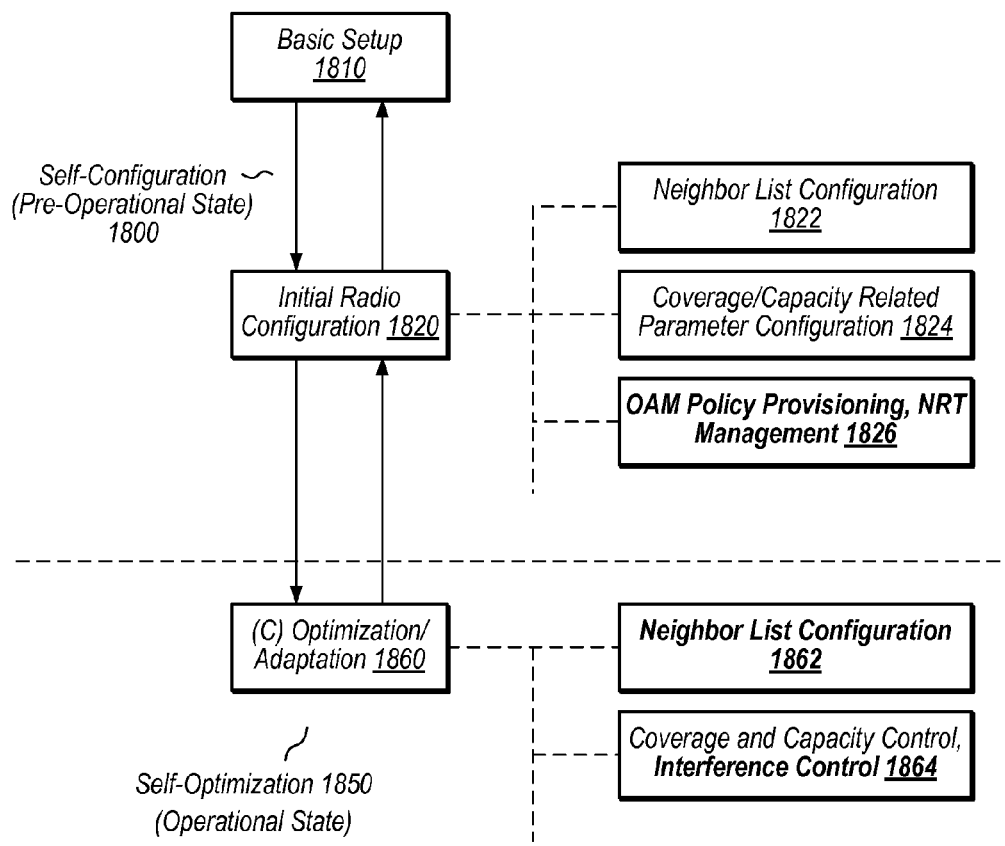
FIG. 18-19 illustrate exemplary aspects of possible SON functionality configured for use in conjunction with managing cellular network elements operating in unlicensed frequency bands, according to some embodiments.

FIG. 18 illustrates exemplary self-organizing network functionality, which may be implemented by a base station (e.g., eNB) operating in a PLMN, which may be similar to the self-configuration and self-optimization functionality illustrated in FIG. 8, but with certain aspects modified and/or added to support management of network elements operating in unlicensed frequency bands. In particular, in addition to basic setup 1810 and the neighbor list configuration 1822 and coverage/capacity related parameter configuration 1824 steps of initial radio configuration 1820, as shown in bold, a step of OAM policy provisioning (e.g., of NEs operating in unlicensed frequency bands) and updating the NRT based on policy updates 1826 may be included in the self-configuration phase 1800, according to some embodiments. Additionally (or alternatively), in the self-optimization phase 1850, the neighbor list configuration 1862 and coverage, capacity, and interference control 1864 steps of optimization/adaptation 1860 may be modified in conjunction with interference control and/or coordination and/or other possible policy decisions, according to some embodiments. As similarly described in relation to FIG. 8, the SON functionality of FIG. 18 may alternatively or additionally include any of a variety of other possible alternative or additional steps (as indicated by the continuing dashed lines illustrated in FIG. 18 following steps 1826 and 1864), e.g., according to various implementations.

Figure 19:
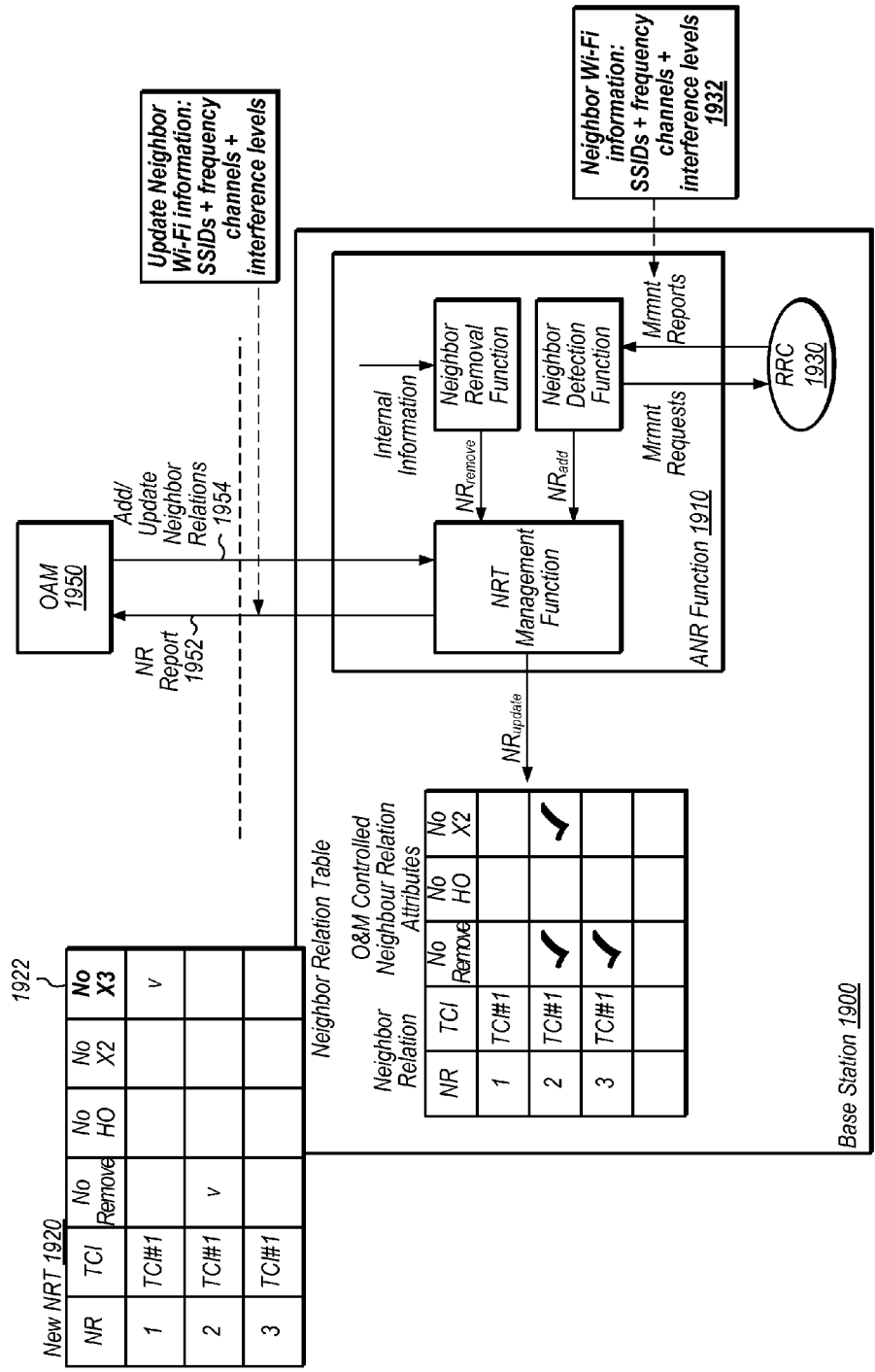

FIG. 19 illustrates exemplary ANR functionality, which may be one example of a SON behavior that may be implemented by a base station in a PLMN. The ANR 1910 functionality illustrated in FIG. 19 may be similar to that illustrated in FIG. 9, but with aspects modified to support management of network elements operating in unlicensed frequency bands. In particular, according to some embodiments, as shown in bold, a 'no X3' column 1922 may be added to the new NRT 1920 to allow the OAM policy manager 1950 to indicate whether the base station 1900 should use the X3 interface in order to initiate procedures (such as handovers, among various other possible procedures) with a Wi-Fi AP parenting a neighbor.

Additionally (or alternatively), in some embodiments, neighbor Wi-Fi information 1932 may be collected from the RRC 1930, for example in measurement reports provided from the RRC 1930 to a neighbor detection function of the ANR 1910. The neighbor Wi-Fi information may potentially include some or all of SSIDs, frequency channels, and interference levels of neighboring Wi-Fi networks detected by the RRC 1930 (e.g., directly or indirectly by way of one or more UEs served by base station 1900). Such neighbor Wi-Fi information may also be provided from a NRT management function of the ANR 1910 to the OAM 1950, for example as part of neighbor relations reports 1952. Additionally (or alternatively), policy updates 1954 for neighbor Wi-Fi APs managed by the base station 1900 may in some instances be received by the NRT management function of the ANR 1910 from the OAM 1950.

In the following further exemplary embodiments are provided.

One set of embodiments may include a method for managing a wireless communication system, comprising: receiving operation and management (OAM) policy and parameter information at a first base station, wherein the first base station is a network element in a first wireless service provider's network, wherein the OAM policy is received from an OAM entity of the first wireless service provider's network; configuring, by the first base station, at least a second base station according to the policy and parameter information, wherein the second base station is a network element in a first wireless service provider's network, wherein the second base station is configured to wirelessly communicate on an unlicensed frequency band.

According to some embodiments, configuring the second base station comprises providing an activation or deactivation indication.

According to some embodiments, configuring the second base station comprises providing an indication of a frequency on which to operate.

According to some embodiments, the first base station is a macro eNodeB configured to provide wireless communication services via LTE, wherein the second base station is one or more of: a small cell configured to provide wireless communication services in the unlicensed frequency band via LTE; or an access point configured to provide wireless communication services in the unlicensed frequency band via Wi-Fi.

According to some embodiments, the method further comprises: receiving, at the first base station, neighbor information from one or more user devices, wherein the neighbor information comprises, for one or more neighbor base stations of the first base station including the second base station, one or more of: identification information; operation frequency information; or interference information; and providing, by the first base station, the neighbor information to the OAM entity of the first wireless service provider's network.

According to some embodiments, the OAM policy and parameters comprises interference control information configured for managing interference in unlicensed frequency bands, wherein the interference control information is based at least in part on inter-operator coordination information.

An additional exemplary embodiment may include a cellular base station (BS), comprising: a radio; and a processing element operably coupled to the radio; wherein the BS is configured to implement any or all parts of any of the methods of the preceding examples.

A further set of exemplary embodiments may include a method for operating an LTE small-cell base station (BS) or Wi-Fi access point (AP), wherein the BS or AP is configured to operate in an unlicensed frequency band as a network element in a first wireless service provider's network, the method comprising: receiving configuration information from a macro base station, wherein the macro base station is a network element in the first wireless service provider's network, wherein the configuration information is for configuring the BS or AP according to an interference management policy for managing interference in the unlicensed frequency band.

An additional exemplary embodiment may include a LTE small-cell base station (BS) or Wi-Fi access point (AP), comprising: a radio; and a processing element operably coupled to the radio; wherein the LTE small-cell base station (BS) or Wi-Fi access point (AP) is configured to implement any or all parts of the method of the preceding example.

A further exemplary set of embodiments may include a non-transitory computer accessible memory medium comprising program instructions which, when executed at a device, cause the device to implement any or all parts of any of the methods of the preceding examples.

A still further exemplary set of embodiments may include a computer program comprising instructions for performing any or all parts of any of the methods of the preceding examples.

Yet another exemplary set of embodiments may include an apparatus comprising means for performing any or all of the method elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for managing a wireless communication system, comprising:
   receiving operation and management (OAM) policy information at a first base station, wherein the first base station is a network element in a first wireless service provider's network, wherein the OAM policy information is received from an OAM entity of the first wireless service provider's network;
   providing to a second base station, by the first base station, information for configuring the second base station according to the OAM policy information, wherein the information for configuring the second base station indicates scheduled operational and non-operational times for the second base station, wherein the second base station is a network element in a first wireless service provider's network, wherein the second base station is configured to wirelessly communicate on an unlicensed frequency band.

2. The method of claim 1,
   wherein the information for configuring the second base station further comprises an indication of a frequency on which to operate.

3. The method of claim 1,
   wherein the first base station is a macro eNodeB configured to provide wireless communication services via LTE,
   wherein the second base station comprises one or more of:
      a small cell configured to provide wireless communication services in the unlicensed frequency band via LTE; or
      an access point configured to provide wireless communication services in the unlicensed frequency band via Wi-Fi.

4. The method of claim 1, the method further comprising:
   receiving, at the first base station, neighbor information from one or more user devices, wherein the neighbor information comprises, for one or more neighbor base stations of the first base station including the second base station, one or more of:
      identification information;
      operation frequency information; or
      interference information;
   providing, by the first base station, the neighbor information to the OAM entity of the first wireless service provider's network.

5. The method of claim 1,
   wherein the OAM policy information comprises interference control information configured for managing interference in unlicensed frequency bands, wherein the interference control information is based at least in part on inter-operator coordination information.

6. A cellular base station (BS), comprising:
a radio; and
an processing element operably coupled to the radio;
wherein the radio and the processing element are configured to:
receive operation and management (OAM) policy information, wherein the OAM policy information comprises information for configuring a network element operating in an unlicensed frequency band; and
provide, according to the OAM policy, a first network element with one or more parameters for operating in an unlicensed frequency band, wherein the one or more parameters comprise a schedule for operating in the unlicensed frequency band.

7. The BS of claim 6,
wherein the OAM policy information comprises information configured to coordination operation of the first network element with one or more other network elements operating in the unlicensed frequency band.

8. The BS of claim 7,
wherein at least a subset of the one or more other network elements are deployed as part of a different network than the first network element.

9. The BS of claim 6,
wherein the one or more parameters further comprise one or more operating frequencies in the unlicensed frequency band.

10. A method for operating a network element, the method comprising:
by a first network element in a first wireless service provider's network:
receiving, from a base station, configuration information for configuring the first network element according to an interference management policy for managing interference in an unlicensed frequency band, wherein the configuration information indicates scheduled operational and non-operational times for the first network element, wherein the base station comprises a network element in the first wireless service provider's network; and
operating according to the configuration information to provide wireless service to one or more user devices in the first wireless service provider's network, wherein operating according to the configuration information comprises activating and deactivating according to the scheduled operational and non-operational times.

11. The method of claim 10, wherein the configuration information further indicates one or more operating frequencies in the unlicensed frequency band, wherein operating according to the configuration information further comprises:
providing wireless service at the one or more indicated operating frequencies during operational times.

12. The method of claim 10, wherein the configuration information further comprises information regarding one or more network elements neighboring the first network element, wherein the method further comprises:
coordinating operation of the first network element in the unlicensed frequency band to reduce interference between the first network element and the one or more network elements neighboring the first network element based at least in part on the information regarding the one or more network elements neighboring the first network element.

13. The method of claim 12,
wherein the one or more network elements neighboring the first network element comprise one or more network elements in a different network than the first network element and/or one or more network elements operating according to a different wireless communication technology than the first network element.

14. The method of claim 10, the method further comprising:
receiving information regarding one or more network elements neighboring the first network element from the one or more user devices in the first wireless service provider's network; and
providing information regarding the one or more network elements neighboring the first network element to the base station, wherein the provided information regarding the one or more network elements neighboring the first network element is usable for updating an operation and management policy for the first wireless service provider's network.

15. The method of claim 10, the method further comprising:
receiving updated configuration information from the base station, wherein the updated configuration information modifies one or more operating parameters for the first network element; and
operating according to the updated configuration information to provide wireless service to one or more user devices in the first wireless service provider's network.

16. The method of claim 10,
wherein the first network element comprises an LTE small-cell base station (BS).

17. The method of claim 10,
wherein the first network element comprises a Wi-Fi access point (AP).

* * * * *